US011358571B2

(12) United States Patent
Kato et al.

(10) Patent No.: US 11,358,571 B2
(45) Date of Patent: Jun. 14, 2022

(54) WHEELED TIRE, AND METHOD FOR PRODUCING WHEELED TIRE

(71) Applicant: YAMAHA FINE TECHNOLOGIES CO., LTD., Hamamatsu (JP)

(72) Inventors: Takeshi Kato, Shimada (JP); Hirotaka Takeyama, Hamamatsu (JP); Yuichi Doki, Hamamatsu (JP)

(73) Assignee: YAMAHA FINE TECHNOLOGIES CO., LTD., Hamamatsu (JP)

( * ) Notice: Subject to any disclaimer, the term of this patent is extended or adjusted under 35 U.S.C. 154(b) by 139 days.

(21) Appl. No.: 16/750,518

(22) Filed: Jan. 23, 2020

(65) Prior Publication Data
US 2020/0156599 A1 May 21, 2020

Related U.S. Application Data

(63) Continuation of application No. PCT/JP2018/027909, filed on Jul. 25, 2018.

(30) Foreign Application Priority Data

Jul. 28, 2017 (JP) .............................. JP2017-147132
Apr. 26, 2018 (JP) .............................. JP2018-085786

(51) Int. Cl.
*B60S 5/04* (2006.01)
*G01M 3/02* (2006.01)
*B60C 5/00* (2006.01)

(52) U.S. Cl.
CPC ................ *B60S 5/04* (2013.01); *B60C 5/001* (2013.01); *G01M 3/02* (2013.01)

(58) Field of Classification Search
CPC .................................... B60S 5/04; B60C 5/001
See application file for complete search history.

(56) References Cited

U.S. PATENT DOCUMENTS

| | | | |
|---|---|---|---|
| 3,877,496 | A | 4/1975 | Sperberg |
| 4,491,013 | A | 1/1985 | Bubik |
| 5,798,696 | A | 8/1998 | Wong |
| 6,330,821 | B1 | 12/2001 | Arnold |
| 2009/0100909 | A1 | 4/2009 | Grosse Bley |
| 2012/0261569 | A1 | 10/2012 | Grosse Bley |
| 2013/0008578 | A1 | 1/2013 | Taylor |

FOREIGN PATENT DOCUMENTS

| | | |
|---|---|---|
| CN | 1784594 A | 6/2006 |
| CN | 201488882 U | 5/2010 |
| FR | 2760271 A1 | 9/1998 |

(Continued)

OTHER PUBLICATIONS

Office Action issued in Japanese Appln. No. 2017-147129 dated Jun. 29, 2021. English machine translation provided.

(Continued)

*Primary Examiner* — Timothy P. Kelly
(74) *Attorney, Agent, or Firm* — Rossi, Kimms & McDowell LLP

(57) ABSTRACT

A wheeled tire includes a tire, and a wheel disposed on the tire. A space between the tire and the wheel is filled with a filler gas. The filler gas includes nitrogen gas having a concentration equal to or greater than a concentration of nitrogen gas in air, and hydrogen gas having a concentration of 0.5% or more. A concentration of oxygen gas in the filler gas is less than a concentration of oxygen gas in air.

6 Claims, 2 Drawing Sheets

(56) References Cited

FOREIGN PATENT DOCUMENTS

| | | |
|---|---|---|
| JP | S5334070 B2 | 9/1978 |
| JP | S53138108 A | 12/1978 |
| JP | H06156008 A | 6/1994 |
| JP | H0656744 U | 8/1994 |
| JP | H06347362 A | 12/1994 |
| JP | H0989708 A | 4/1997 |
| JP | 2001255229 A | 9/2001 |
| JP | 2002046583 A | 2/2002 |
| JP | 2002139397 A | 5/2002 |
| JP | 2003291606 A | 10/2003 |
| JP | 2003331353 A | 11/2003 |
| JP | 2005055263 A | 3/2005 |
| JP | 2005335459 A | 12/2005 |
| JP | 2007055559 A | 3/2007 |
| JP | 2008026052 A | 2/2008 |
| JP | 2008513799 A | 5/2008 |
| JP | 2009056908 A | 3/2009 |
| JP | 2012047651 A | 3/2012 |
| JP | 2012106573 A | 6/2012 |
| JP | 2013515252 A | 5/2013 |
| JP | 2015040836 A | 3/2015 |
| JP | 2016049818 A | 4/2016 |

OTHER PUBLICATIONS

Office Action issued in Japanese Appln. No. 2017-147131 dated Jun. 29, 2021. English machine translation provided.
Office Action issued in Japanese Appln. No. 2017-147132 dated Jun. 29, 2021. English machine translation provided.
Office Action issued in Chinese Appln. No. 201880047812.8 dated Jul. 6, 2021. English machine translation provided.
Office Action issued in Korean Appln. No. 10-2020-7001269 dated Jul. 8, 2021. English machine translation provided.
Office Action issued in Chinese Appln. No. 201880049571.0 dated Mar. 3, 2021. English machine translation provided.
Office Action issued in Chinese Appln. No. 201880047812.8 dated Feb. 2, 2021. English translation provided.
Extended European Search Report issued in European Appln. No. 18839176.7 dated Mar. 19, 2021.
International Search Report issued in Intl. Appln. No. PCT/JP2018/027909 dated Sep. 11, 2018. English translation provided.
Written Opinion issued in Intl. Appln. No. PCT/JP2018/027909 dated Sep. 11, 2018.
International Search Report issued in Intl. Appln. No. PCT/JP2018/026183 dated Sep. 18, 2018. English translation provided.
Written Opinion issued in Intl. Appln. No. PCT/JP2018/026183 dated Sep. 18, 2018.
Office Action issued in Japanese Appln. No. 2018-096751 dated Jul. 3, 2018. English machine translation provided.
Yamaha Fine Technologies Co., Ltd. "Helium Leak Tester." Retrieved on Jul. 24, 2017. English translation provided.
Copending U.S. Appl. No. 16/750,609, filed Jan. 23, 2020.
Office Action issued in Chinese Appln. No. 201880049571.0 dated Nov. 19, 2021. English machine translation provided.
Office Action issued in Chinese Appln. No. 201880047812.8 dated Dec. 3, 2021. English machine translation provided.
Office Action issued in U.S. Appl. No. 16/750,609 dated Sep. 28, 2021.
Office Action issued in Japanese Appln. No. 2018-085786 dated Oct. 5, 2021. English machine translation provided.

WHEELED TIRE, AND METHOD FOR PRODUCING WHEELED TIRE

CROSS-REFERENCE TO RELATED APPLICATIONS

The present application is a continuation application of International Application No. PCT/JP2018/027909, filed Jul. 25, 2018, which claims priority to Japanese Patent Application No. 2017-147132, filed Jul. 28, 2017, and Japanese Patent Application No. 2018-085786, filed Apr. 26, 2018. The contents of these applications are incorporated herein by reference.

BACKGROUND OF THE INVENTION

Field of the Invention

The present invention relates to a wheeled tire, and a method for producing a wheeled tire.

Description of Related Art

Conventionally, when a wheeled tire is produced, a wheel is attached to a tire, and then the space between the tire and the wheel is often filled with air (about 80% nitrogen and about 20% oxygen). Furthermore, the space between the tire and the wheel is also sometimes filled with nitrogen gas to suppress pressure reductions in the space between the tire and the wheel, and to inhibit oxidation of the wheel to maintain the strength of the wheel. The suppression of pressure reduction inside the wheeled tire and maintaining the strength of the wheel contribute to improvements in the steering stability of the vehicle on which the wheeled tire is installed.

It is necessary to inspect a wheeled tire for gas leaks from the space described above after production. Japanese Unexamined Patent Application, First Publication No. 2016-049818 (hereinafter referred to as Patent Document 1) discloses a method of immersing part of a tire in a vessel filled with a liquid to inspect a wheeled tire installed on a motorcycle for air leaks (gas leaks). Furthermore, gas leak inspection methods for a wheeled tire also include a method of observing a pressure drop in the space between the tire and the wheel.

SUMMARY OF THE INVENTION

However, in the gas leak inspection methods according to the related art described above, there is a problem in that the gas leak inspection requires a long time. For example, in the method of Patent Document 1, because it is necessary to wet and dry the tire, the gas leak inspection time becomes long. Furthermore, in the method that observes a pressure drop inside the wheeled tire, correct inspection of the gas leak requires the observation to be performed over a long time.

The present invention has been made in view of the circumstances described above. An exemplary object of the present invention is to provide a wheeled tire and a method for producing a wheeled tire that enable gas leaks in a wheeled tire to be inspected in a short time, and enable the steering stability of a vehicle to be improved.

A wheeled tire according to an aspect of the present invention includes a tire, and a wheel disposed on the tire. A space between the tire and the wheel is filled with a filler gas. The filler gas includes nitrogen gas having a concentration equal to or greater than a concentration of nitrogen gas in air, and hydrogen gas having a concentration of 0.5% or more. A concentration of oxygen gas in the filler gas is less than a concentration of oxygen gas in air.

A method for producing a wheeled tire according to an aspect of the present invention includes: disposing a wheel on a tire; and filling a space between the tire and the wheel with a mixed gas, the mixed gas including nitrogen gas and hydrogen gas. A concentration of the hydrogen gas inside the space filled with the mixed gas is 0.5% or more.

A method for producing a wheeled tire according to an aspect of the present invention includes: disposing a wheel on a tire; filling a space between the tire and the wheel with air or nitrogen gas; and injecting hydrogen gas into the space between the tire and the wheel. A concentration of the hydrogen gas inside the space filled with the air or the nitrogen gas, and into which the hydrogen gas has been injected, is 0.5% or more.

EMBODIMENTS FOR CARRYING OUT THE INVENTION

First Embodiment

Hereunder, a first embodiment of the present invention will be described with reference to FIGS. 1 to 3.

Figure 1:
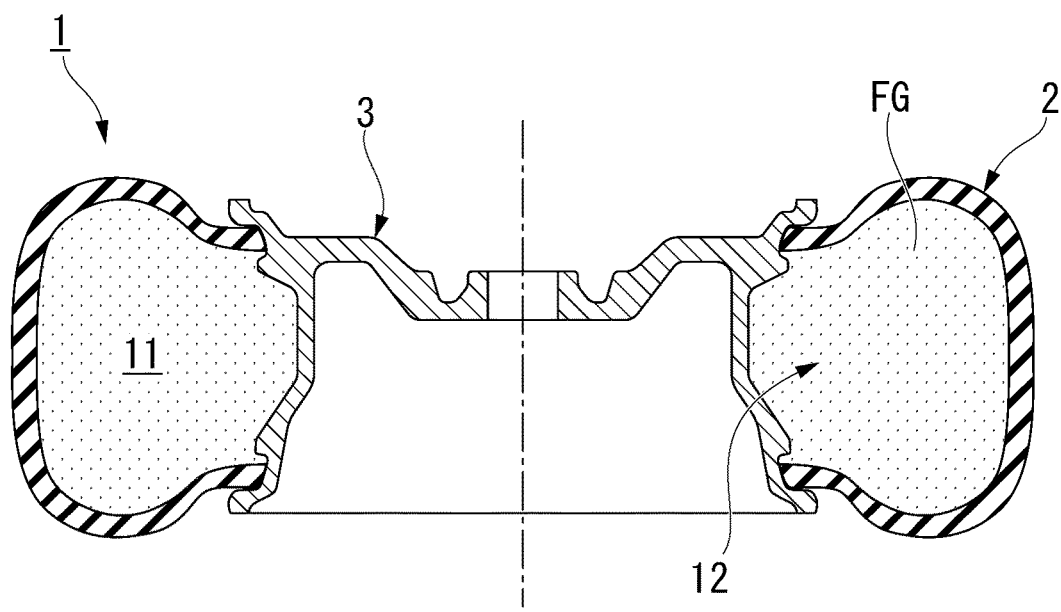
FIG. 1 is a cross-sectional view showing a wheeled tire according to a first embodiment of the present invention.

As shown in FIG. 1, a wheeled tire 1 according to the present embodiment is used in a vehicle or the like. The wheeled tire 1 includes a tire 2 and a wheel 3.

The tire 2 is formed in an annular shape by an elastic material such as rubber. There is an annular cavity 11 inside the tire 2. An opening 12 is formed on a radial inner side of the tire 2. The opening 12 connects the cavity 11 of the tire 2 to the space on the outside. The opening 12 of the tire 2 extends around the entire circumferential direction of the tire 2. The wheel 3 is assembled on the tire 2. Specifically, the wheel 3 is disposed on the radial inner side of the tire 2, and closes the opening 12 of the tire 2.

In a state where the wheel 3 is assembled on the tire 2, the cavity 11 of the tire 2 (the space between the tire 2 and the wheel 3) is filled with a filler gas FG.

The filler gas FG filling the cavity 11 of the tire 2 includes nitrogen gas and a reaction gas.

The concentration of nitrogen gas in the filler gas FG is equal to or greater than the concentration of nitrogen gas (78%) in air (78% nitrogen, 21% oxygen). The concentration of nitrogen gas may be for example 85% or more.

Figure 2:
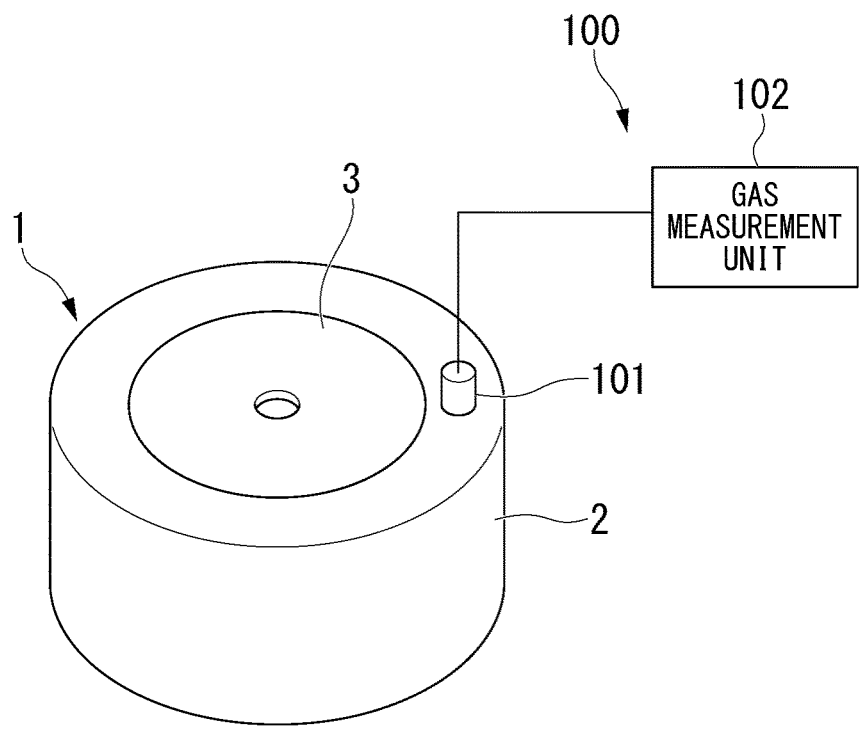
FIG. 2 is a diagram showing an example of a tire inspection device that performs gas leak inspection of the wheeled tire in FIG. 1.

The reaction gas is a gas detected by a gas sensor 101 (see FIG. 2). The reaction gas is hydrogen gas or helium gas. The concentration of the reaction gas in the filler gas FG may be 0.5% or more. The concentration of the reaction gas may be for example 3% or more. Furthermore, if the reaction gas is helium gas, the concentration of helium gas may be for example 10% or more.

The filler gas FG may, for example, include only nitrogen gas and the reaction gas. The filler gas FG may, for example, additionally include other gases such as oxygen gas. However, the concentration of oxygen gas in the filler gas FG is less than the concentration of oxygen gas in air (21%). The concentration of the oxygen gas may be for example less than 7%.

The pressure (gas pressure) in the cavity 11 of the tire 2 after being filled with the filler gas FG is greater than the air pressure outside the cavity 11 (for example, atmospheric pressure: 100 kPa). The pressure in the cavity 11 of the tire 2 is, for example, a pressure suitable for traveling of the vehicle on which the wheeled tire 1 is installed (for example, about 350 kPa).

Next, a method for producing the wheeled tire 1 according to the present embodiment will be described.

Figure 3:
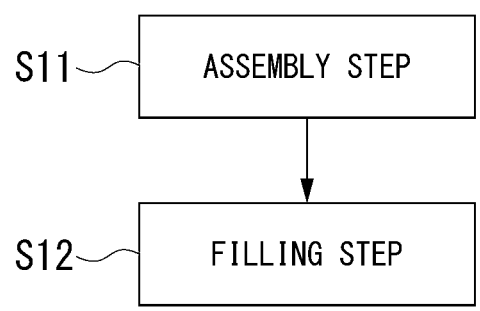
FIG. 3 is a flowchart showing a method for producing the wheeled tire according to the first embodiment of the present invention.

The method for producing the wheeled tire 1 of the present embodiment includes, as shown in FIG. 3, an assembly step S11 and a filling step S12.

In the assembly step S11, the wheel 3 is assembled on the tire 2. Specifically, by disposing the wheel 3 on the radial inner side of the tire 2, the opening 12 on the radial inner side of the tire 2 is closed by the wheel 3. In the state after the assembly step S11, the cavity 11 of the tire 2 (the space between the tire 2 and the wheel 3) contains air having a pressure equivalent to that outside the cavity 11 (for example, atmospheric pressure).

In the filling step S12, mixed gas is filled into the cavity 11 of the tire 2. The filling step S12 is performed after the assembly step S11. Thereby, production of the wheeled tire 1 is completed.

In the filling step S12, for example, the cavity 11 of the tire 2 may be filled with the mixed gas after removing some or all of the air inside the cavity 11 of the tire 2. In the filling step S12 of the present embodiment, the cavity 11 of the tire 2 is filled with the mixed gas in a state where the cavity 11 of the tire 2 contains air. That is to say, in the state after the filling step S12, the mixed gas and air become mixed inside the cavity 11 of the tire 2. The gas in which the mixed gas and air are mixed corresponds to the filler gas FG in the wheeled tire 1 after production.

In the filling step S12, the mixed gas is filled into the cavity 11 of the tire 2 so that the pressure (gas pressure) in the cavity 11 of the tire 2 becomes higher than the pressure (atmospheric pressure) outside the cavity 11. In the filling step S12, for example, the mixed gas is filled into the cavity 11 of the tire 2 so that the pressure in the cavity 11 of the tire 2 becomes a pressure (for example 350 kPa) suitable for traveling of the vehicle on which the wheeled tire 1 is installed.

The mixed gas includes nitrogen gas and a reaction gas.

The concentration of nitrogen gas in the mixed gas is equal to or greater than the concentration of nitrogen gas in air (78%).

The reaction gas is a gas detected by the gas sensor 101 (see FIG. 2), and is hydrogen gas or helium gas. The concentration of the reaction gas in the mixed gas is set so that in the state after the cavity 11 of the tire 2 has been filled with the mixed gas, the concentration of the reaction gas included in the filler gas FG is 0.5% or more. As described above, in the filling step S12 of the present embodiment, the cavity 11 of the tire 2 is filled with the mixed gas in a state where the cavity 11 of the tire 2 contains air. For this reason, the concentration of the reaction gas in the mixed gas is higher than the concentration of the reaction gas in the filler gas FG.

The mixed gas may, for example, include only nitrogen gas and the reaction gas. Furthermore, if the reaction gas is hydrogen gas, for example, a gas in which the concentration of hydrogen gas is 5% and the concentration of nitrogen gas is 95% may be used as the mixed gas. A mixed gas including 5% hydrogen and 95% nitrogen is commercially available, and can be easily obtained. The higher the concentration of the reaction gas, the easier it is for the gas sensor 101 to detect the reaction gas. However, because hydrogen gas is a flammable gas, when the reaction gas is hydrogen gas, the concentration is set below an upper limit value defined by regulations.

The mixed gas may, for example, additionally include other gases such as oxygen gas. If the mixed gas also includes oxygen gas, the concentration of oxygen gas in the mixed gas is less than the concentration of oxygen gas in air (21%).

The concentration of the reaction gas in the mixed gas can be calculated based on a target concentration for the reaction gas in the filler gas FG, using equation (1) below.

The concentration of nitrogen gas in the mixed gas can be calculated based on a target concentration for nitrogen gas in the filler gas FG, using equation (2) below.

The concentration of oxygen gas in the mixed gas can be calculated based on a target concentration for oxygen gas in the filler gas FG, using equation (3) below.

[Equation 1]
$$A = \frac{\Delta P \times (a/100)}{P0 + \Delta P} \times 100 \qquad \text{Equation (1)}$$

[Equation 2]
$$B = \frac{P0 \times (78/100) + \Delta P \times (b/100)}{P0 + \Delta P} \times 100 \qquad \text{Equation (2)}$$

[Equation 3]
$$C = \frac{P0 \times (21/100) + \Delta P \times (c/100)}{P0 + \Delta P} \times 100 \qquad \text{Equation (3)}$$

In equations (1) to (3) above, "P0" represents the pressure in the cavity 11 of the tire 2 before performing the filling step S12 (the air pressure outside the cavity 11 of the tire 2). "$\Delta P$" indicates the pressure increase in the cavity 11 of the tire 2 resulting from performing the filling step S12 (filling pressure). "$\Delta P$" corresponds to the filling amount of the mixed gas which fills the cavity 11 of the tire 2 in the filling step S12. "$P0+\Delta P$" represents the pressure in the cavity 11 of the tire 2 of the wheeled tire 1 after production.

In equation (1), "A" represents the concentration of the reaction gas in the filler gas FG in the wheeled tire 1 after production. Furthermore, "a" represents the concentration of the reaction gas in the mixed gas.

In equation (2), "B" represents the concentration of nitrogen gas in the filler gas FG. Furthermore, "b" represents the concentration of nitrogen gas in the mixed gas.

In equation (3), "C" represents the concentration of oxygen gas in the filler gas FG. Furthermore, "c" represents the concentration of oxygen gas in the mixed gas.

The concentration of the reaction gas in the mixed gas may be for example 0.7% or more. In this case, the concentration of the reaction gas in the filler gas FG can be made 0.5% or more. For example, in equation (1) above, when "$\Delta P0=100$ kPa", "$\Delta P=250$ kPa", and "a=0.7%", the concentration of the reaction gas included in the filler gas FG can be made 0.5%.

The concentration of the reaction gas in the mixed gas is made 22% or less. In this case, the concentration of nitrogen gas in the mixed gas can be made 78% or more. Thereby, the concentration of nitrogen gas included in the filler gas FG can be made equal to or greater than concentration of nitrogen gas in air (78%).

If the mixed gas includes oxygen gas, the concentration of oxygen gas in the mixed gas is made less than 21%. In this case, the concentration of oxygen gas in the filler gas FG can be made less than the concentration of oxygen gas in air (21%).

A gas leak test of the wheeled tire 1 of the present embodiment produced as described above may be performed, for example, using the tire inspection device 100 shown in FIG. 2.

The tire inspection device 100 includes a gas sensor 101. The gas sensor 101 detects the reaction gas included in the filler gas FG filling the cavity 11 of the tire 2, on the outside of the wheeled tire 1. That is to say, the gas sensor 101 detects the reaction gas included in the filler gas FG that leaks out from the cavity 11 of the tire 2 to the outside. Specifically, the gas sensor 101 detects the concentration of the reaction gas.

For example, the gas sensor 101 may be provided so as to move along the outer surface of the wheeled tire 1. Furthermore, for example, a plurality of gas sensors 101 may be arranged along the outer surface of the wheeled tire 1. In this case, it is possible to efficiently inspect the wheeled tire 1 for gas leaks from the entire outer surface of the tire 2 and the wheel 3. In the present embodiment, a case will be described in which a gas leak inspection is performed using two gas sensors 101 having a minimum detection sensitivity of 0.5 ppm, with one sensor disposed on each of the upper surface and the lower surface of the tire 2.

The tire inspection device 100 includes a gas measurement unit 102. The gas measurement unit 102 is connected to the gas sensors 101. The gas measurement unit 102 determines whether or not a gas leak has occurred in the wheeled tire 1, based on the concentration of the reaction gas detected by the gas sensors 101. The gas measurement unit 102 determines that "a gas leak has not occurred in the wheeled tire 1 (there are no defects such as holes in the wheeled tire 1)" if the concentration of the reaction gas detected by the gas sensors 101 is a predetermined threshold or lower (or less than a threshold). Furthermore, the gas measurement unit 102 determines that "a gas leak has occurred in the wheeled tire 1 (there are defects such as holes in the wheeled tire 1)" if the concentration of the reaction gas detected by the gas sensors 101 is a predetermined threshold or higher. In the present embodiment, the determination is performed with a predetermined threshold of 4 ppm. It is desirable to set the threshold to approximately ten times the reaction gas concentration present in air, and a suitable value may be set according to the type of reaction gas. The gas measurement unit 102 may have a display screen that displays for example, the reaction gas concentration detected by the gas sensors 101, the gas leak determination result, and the like.

As described above, in the wheeled tire 1 according to the present embodiment, the concentration of the reaction gas (hydrogen gas or helium gas) in the filler gas FG filling the cavity 11 of the tire 2 (the space between the tire 2 and the wheel 3) is 0.5% or more, and is higher than the concentration of hydrogen gas (0.5 ppm) or the concentration of helium gas (5 ppm) present in air. Consequently, by arranging the gas sensors 101 that respond to the reaction gas on the outside of the wheeled tire 1, the wheeled tire 1 can be inspected for gas leaks in a short time. Specifically, a case where the concentration of the reaction gas in the filler gas FG is 0.5% will be described. In this case, by using the tire inspection device 100 to inspect the wheeled tire 1 for gas leaks, a gas leak in the wheeled tire 1 that causes the pressure to decrease by approximately 10 kPa per day can be detected in about 4 minutes.

In the wheeled tire 1 according to the present embodiment, if the concentration of the reaction gas (hydrogen gas or helium gas) in the filler gas FG is 3% or more, the difference between the concentration of the reaction gas and the concentration of hydrogen gas or helium gas present in air becomes large. Consequently, a gas leak inspection of the wheeled tire 1 using the gas sensors 101 enables the inspection to be performed in a shorter time. For example, a case where the concentration of the reaction gas is 3% will be described. In this case, by using the tire inspection device 100 to inspect the wheeled tire 1 for gas leaks, a gas leak in the wheeled tire 1 that causes the pressure to decrease by approximately 10 kPa per day can be detected in about 40 seconds.

In the wheeled tire 1 according to the present embodiment, if the concentration of the reaction gas in the filler gas FG is 10% or more, the difference between the concentration of the reaction gas and the concentration of hydrogen gas or helium gas present in air becomes even larger. Consequently, a gas leak inspection of the wheeled tire 1 using the gas sensors 101 enables the inspection to be performed in an even shorter time. Specifically, a case where the concentration of the reaction gas is 10% will be described. In this case, by using the tire inspection device 100 to inspect the wheeled tire 1 for gas leaks, a gas leak in the wheeled tire 1 that causes the pressure to decrease by approximately 10 kPa per day can be detected in about 6 to 8 seconds. Because hydrogen gas is a flammable gas, the use of hydrogen gas at concentrations of 10% or higher is not recommended for safety reasons. Therefore, a case where the concentration of the reaction gas in the filler gas FG is 10% or more serves as a preferable example when helium gas is used as the reaction gas.

In the wheeled tire 1 according to the present embodiment, the concentration of nitrogen gas in the filler gas FG filling the space between the tire 2 and the wheel 3 is equal to or greater than the concentration of nitrogen gas in air (78%). Consequently, compared to a case where the inside of the wheeled tire 1 is filled with air, a pressure decrease inside the wheeled tire 1 resulting from the filler gas FG permeating the tire 2 can be suppressed.

In the wheeled tire 1 according to the present embodiment, the concentration of oxygen gas in the filler gas FG is less than the concentration of oxygen gas in air (21%). Consequently, compared to a case where the inside of the wheeled tire 1 is filled with air, oxidation of the wheel 3 by oxygen gas can be suppressed and the strength of the wheel 3 maintained.

As a result of the above, the steering stability of the vehicle on which the wheeled tire 1 is installed can be improved.

In the wheeled tire 1 according to the present embodiment, if the concentration of nitrogen gas in the filler gas FG is 85% or more, a pressure decrease inside the wheeled tire 1 can be further suppressed. Therefore, the steering stability of the vehicle on which the wheeled tire 1 is installed can be further improved. In equation (2), when "P0=100 kPa", "ΔP=250 kPa", and "b=90%", the concentration of nitrogen gas in the filler gas FG becomes 86.6%. Consequently, by using a mixed gas including approximately 90% or 90% or more nitrogen gas, a nitrogen gas concentration of 85% or more can be realized.

In the wheeled tire 1 according to the present embodiment, if the concentration of oxygen gas in the filler gas FG is less than 7%, oxidation of the wheel 3 by oxygen gas can be further suppressed, and the strength of the wheel 3 can be further maintained. Therefore, the steering stability of the vehicle on which the wheeled tire 1 is installed can be further improved. In equation (3), when "P0=100 kPa", "ΔP=250 kPa", and "c=0%", the concentration of oxygen gas in the filler gas FG becomes 6%. Consequently, by using a mixed gas that does not include oxygen gas, or a mixed gas including a very small amount of oxygen gas, an oxygen gas concentration of less than 7% can be realized.

According to the method for producing the wheeled tire 1 of the present embodiment, a wheeled tire 1 can be produced in which the filler gas FG filling the cavity 11 of the tire 2 includes nitrogen gas at a concentration of more than that in air (78%), and a reaction gas (hydrogen gas or helium gas) at a concentration of 0.5% or more.

According to the method for producing the wheeled tire 1 of the present embodiment, the cavity 11 of the tire 2 is filled with a mixed gas including nitrogen gas and the reaction gas in the filling step S12. As a result, compared to a case where nitrogen gas and the reaction gas are introduced into the cavity 11 of the tire 2 in separate steps, the wheeled tire 1 can be efficiently produced. Furthermore, the ratio between the gases (nitrogen gas and the reaction gas) in the cavity 11 of the tire 2 can be kept constant.

Second Embodiment

Next, a second embodiment of the present invention will be described with reference to FIG. 4. In the second embodiment, only the method for producing the wheeled tire is different, and the configuration of the wheeled tire and the like is the same in the first embodiment. In the second embodiment, the same components as those in the first embodiment are denoted by the same reference symbols, and description thereof is omitted.

Figure 4:
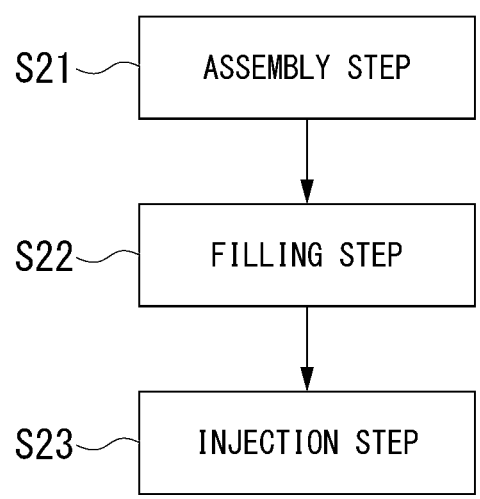
FIG. 4 is a flowchart showing a method for producing a wheeled tire according to a second embodiment of the present invention.

The method for producing the wheeled tire 1 according to the present embodiment includes, as shown in FIG. 4, an assembly step S21, a filling step S22, and an injection step S23. The assembly step S21 is the same as the assembly step S11 of the first embodiment (see FIG. 3).

In the filling step S22, the cavity 11 of the tire 2 is filled with air (78% nitrogen, 21% oxygen) or nitrogen gas (concentration 100%). The filling step S22 is performed after the assembly step S21. In the filling step S22, for example, after removing some or all of the air inside the cavity 11 of the tire 2, the cavity 11 of the tire 2 may be filled with the nitrogen gas. In the filling step S22 of the present embodiment, the cavity 11 of the tire 2 is filled with air or nitrogen gas in a state where the cavity 11 of the tire 2 contains air.

In the filling step S22, the cavity 11 of the tire 2 is filled with air or nitrogen gas so that the pressure (gas pressure) in the cavity 11 of the tire 2 becomes higher than the pressure (atmospheric pressure) outside the cavity 11. In the filling step S22, for example, the cavity 11 of the tire 2 is filled with air or nitrogen gas so that the pressure in the cavity 11 of the tire 2 becomes suitable for traveling of the vehicle on which the wheeled tire 1 is installed (for example 350 kPa).

In the injection step S23, the reaction gas (concentration 100%) is injected into the cavity 11 of the tire 2. The reaction gas is hydrogen gas or helium gas. The injection step S23 is performed after the filling step S22. As a result, the production of the wheeled tire 1 is completed.

In the injection step S23, the reaction gas may be injected into the cavity 11 of the tire 2 so that the concentration of the reaction gas included in the filler gas FG in the wheeled tire 1 after production becomes 0.5% or more. Furthermore, in the injection step S23, the reaction gas may be injected into the cavity 11 of the tire 2 so that the pressure in the cavity 11 of the tire 2 falls within a pressure range which is suitable for traveling of the vehicle on which the wheeled tire 1 is installed (for example, about 350 kPa±10 kPa).

The injection amount of the reaction gas which is injected into the cavity 11 of the tire 2 in the injection step S23 can be calculated by equation (4) below.

[Equation 4]

$$D = \frac{\Delta P2}{P0 + \Delta P1 + \Delta P2} \times 100 \qquad \text{Equation (4)}$$

In equation (4) above, "P0" represents the pressure in the cavity 11 of the tire 2 before performing the filling step S22 and the injection step S23 (the air pressure outside the cavity 11 of the tire 2). "ΔP1" indicates the pressure increase in the cavity 11 of the tire 2 resulting from performing the filling step S22 (filling pressure). "ΔP1" corresponds to the filling amount of air or nitrogen gas which fills the cavity 11 of the tire 2 in the filling step S22. "ΔP2" indicates the pressure increase in the cavity 11 of the tire 2 resulting from performing the injection step S23 (filling pressure). "ΔP2" corresponds to the injection amount of the reaction gas which is injected into the cavity 11 of the tire 2 in the injection step S23. "P0+ΔP1+ΔP2" represents the pressure in the cavity 11 of the tire 2 of the wheeled tire 1 after production. "D" represents the concentration of the reaction gas in the filler gas FG in the wheeled tire 1 after production.

The injection amount (filling pressure) of the reaction gas injected into the cavity 11 of the tire 2 in the injection step S23 may be for example 1.7 kPa or more. In this case, the concentration of the reaction gas in the filler gas FG can be made 0.5% or more. For example, in equation (4) above, when "P0=100 kPa", "ΔP1=250 kPa", and "ΔP2=1.7 kPa", the concentration D of the reaction gas included in the filler gas FG can be made 0.5%.

In the method of production of the present embodiment, by performing the filling step S22 and the injection step S23 described above, the concentration of nitrogen gas included in the filler gas FG in the wheeled tire 1 after production can be made equal to or greater than concentration of nitrogen gas in air (78%). Furthermore, the concentration of oxygen gas included in the filler gas FG can be made less than the concentration of oxygen gas in air (21%).

According to the method for producing the wheeled tire 1 of the present embodiment, the same effects as those of the first embodiment can be obtained.

Furthermore, according to the method for producing the wheeled tire 1 of the present embodiment, it is possible to perform a gas leak inspection of the wheeled tire 1 by simply injecting the reaction gas (hydrogen gas or helium gas) into the wheeled tire 1 while the pressure in the cavity 11 of the tire 2 is at a pressure which is suitable for traveling of the vehicle, that is to say, into the wheeled tire 1 while in use or immediately prior use. Moreover, it is also possible to only inject the reaction gas into a wheeled tire 1 that requires a gas leak inspection.

In the production method of the second embodiment, the injection step S23 may be for example performed after the assembly step S21 and before the filling step S22. In this case, in the injection step S23, for example, the cavity 11 of the tire 2 may be filled with the reaction gas (hydrogen gas or helium gas) in a state where air is inside the cavity 11 of the tire 2. Furthermore, in the injection step S23, for example, the reaction gas may be injected into the cavity 11 of the tire 2 after removing some or all of the air inside the cavity 11 of the tire 2.

Embodiments of the present invention have been described in detail above. However, the present invention is not limited to the embodiments above, and various changes may be applied within a scope not departing from the spirit of the present invention.

In the description of the embodiments of the present invention (including the description of the first and second embodiments), the concentration refers to a volume percent concentration, and "%" refers to "vol %".

According to an embodiment of the present invention, a wheeled tire can be inspected for a gas leak in a short time, and the steering stability of the vehicle on which the wheeled tire is installed can be improved.

The present invention may be applied to a wheeled tire, and a method for producing a wheeled tire.

What is claimed is:

1. A method for producing a wheeled tire, comprising:
   filling a space between a tire and a wheel with nitrogen gas only or both nitrogen gas and oxygen gas, the tire being disposed on the wheel;
   injecting hydrogen gas, which serves as a reaction gas, into the space whose pressure has become suitable for traveling of a vehicle; and
   performing an inspection for a leak of the injected reaction gas from the tire disposed on the wheel,
   wherein a concentration of the injected reaction gas in the space is 0.5% or more.

2. The method according to claim 1,
   wherein in a case where the space contains both the nitrogen gas and the oxygen gas:
   a concentration of nitrogen gas in the space in which the reaction gas is injected is equal to or more than a concentration of nitrogen gas in the air, and
   a concentration of oxygen gas in the space in which the reaction gas is injected is less than a concentration of oxygen gas in the air.

3. The method according to claim 1,
   wherein the concentration of the injected reaction gas in the space is in a range of 0.5% to 22%.

4. A method for producing a wheeled tire, comprising:
   filling a space between a tire and a wheel with nitrogen gas only or both nitrogen gas and oxygen gas such that a pressure in the space becomes a pressure that is suitable for traveling of a vehicle in a case where the tire and the wheel are installed on the vehicle, the tire being disposed on the wheel;
   injecting hydrogen gas, which serves as a reaction gas, into the space after the space has the pressure that is suitable for the traveling of the vehicle in the case where the tire and the wheel are installed on the vehicle; and
   performing an inspection for a leak of the injected reaction gas from the tire disposed on the wheel,
   wherein a concentration of the injected reaction gas in the space is 0.5% or more.

5. The method according to claim 4,
   wherein in a case where the space contains both the nitrogen gas and the oxygen gas:
   a concentration of nitrogen gas in the space in which the reaction gas is injected is equal to or more than a concentration of nitrogen gas in the air, and
   a concentration of oxygen gas in the space in which the reaction gas is injected is less than a concentration of oxygen gas in the air.

6. The method according to claim 4,
   wherein the concentration of the injected reaction gas in the space is in a range of 0.5% to 22%.

* * * * *